UNITED STATES PATENT OFFICE.

WILLIAM WORTH BURSON, OF CHICAGO, ILLINOIS.

PROCESS OF WELDING WROUGHT-IRON TO CAST-IRON.

SPECIFICATION forming part of Letters Patent No. 356,982, dated February 1, 1887.

Application filed October 28, 1886. Serial No. 217,482. (No specimens.)

*To all whom it may concern:*

Be it known that I, WILLIAM WORTH BURSON, residing at Chicago, in the county of Cook and State of Illinois, have invented certain new and useful Improvements in the Process of Welding Wrought-Iron to Cast-Iron in the Operation of Casting the Same; and I do hereby declare that the following is a full, clear, and exact description of the invention, which will enable others skilled in the art to which it appertains to make and use the same.

Heretofore when it was desired to weld cast-iron and wrought-iron together in the operation of casting a sufficient amount of the molten metal was poured upon the wrought piece to bring the latter to a welding heat, when on cooling a weld more or less perfect would be had. This plan was not practical when the amount of molten metal was not sufficient to bring the wrought part to a welding heat, and in such cases recourse was had to the practice of "flowing through"—that is, to run enough metal over the wrought piece to bring it to a welding heat without regard to the requirements of the molds. This plan is always objectionable and frequently impracticable. It has been recommended to coat the wrought piece with tar or other carbonaceous substances, while others recommended a coating of tin before casting upon it. Not much, if anything, was gained by any of these processes in the degree of heat necessary to produce a genuine weld, and they had the objections pointed out as belonging to the first-mentioned plan. It will be found that in none of these plans was anything done which added to the strength of the iron, and since the weld was generally somewhat imperfect it could not be relied upon where the full strength of the metal was required.

The object of my invention is to furnish means whereby greater strength of union can be had than has heretofore been obtained, and such that either large or small bodies can be welded with facility in the operation of casting. This I accomplish by coating the wrought piece with aluminum, or an alloy of the same with some cheaper or more fusible metal, as will be fully explained hereinafter.
The theory of my process is that the wrought-iron is to be coated by heat with an alloy stronger than cast-iron and fusible at a lower degree of heat, so that the molten iron may fuse and unite with alloy already united to the wrought part, and thus produce a perfect weld.

The wrought piece to be cast about or upon is made bright and clean, either mechanically or chemically, and is then placed in the melted aluminum or alloy and allowed to remain until coated, when it is wiped to remove the surplus coating and is ready to be placed in the mold to be cast upon.

The operation of coating the wrought piece is made easier by covering it with borax or some other good flux before placing in the melted metal, and after coating I prefer to dip the piece into a strong solution of borax while still hot and keep dry until placed in the mold.

It has been found that aluminum mixed with iron adds greatly to its strength, and an excellent result is obtained by using this metal to coat the wrought piece, as already described. The cost of aluminum in many cases would be a drawback to its use, and so I alloy it with a cheaper metal—as with copper—to the extent of about ten per cent. aluminum and ninety per cent. copper. This makes a very strong alloy, and when fused by the melted iron makes a much stronger union than where a simple weld is made without the alloy.

When the cast metal is not of sufficient comparative bulk to bring the alloyed coating of the wrought piece to a melting heat, the melting-point of the alloy should be reduced with tin, which, melting easier, reduces the melting-point of the alloy in proportion to the amount of tin used, whereby the fusibility of the coating is readily brought to the requirements of the case—that is, so that it shall be melted by the molten iron brought in contact with it.

It should be borne in mind that tin is only added to the alloy to reduce its melting-point, and should never be used where the heat of the cast-iron used will melt the coating under the conditions in which it is placed. Tin weakens the alloy, but leaves it strong enough usually for the light castings for which it is recommended, and much stronger than tin and copper without aluminum. It requires less tin to bring aluminum-bronze to a given fusible point than would be used with copper alone.

This invention has a wide range of usefulness not heretofore reached by the processes in use, as will be readly seen and appreciated by the skilled artisan.

In this specification where the word "iron" is used it is meant to include also steel in all its forms.

I do not wish to confine myself to the exact proportions or routine of operation herein set forth, as numerous changes can be made without defeating the successful use of the process here described.

What I claim as my invention, and desire to secure by Letters Patent, is—

The coating of wrought-iron by heat with aluminum or an alloy of the same preparatory to being cast about with molten iron, substantially as and for the purpose set forth.

WILLIAM WORTH BURSON.

Witnesses:
WM. A. TALCOTT,
J. F. WEYBURN.